Patented May 24, 1927.

1,629,648

UNITED STATES PATENT OFFICE.

WARREN F. BLEECKER, OF BOULDER, COLORADO.

GLASS COMPOSITION.

No Drawing.       Application filed July 22, 1922.  Serial No. 576,886.

My invention relates to a composition of matter for the production of red glass and its object is to provide a glass suitable for many different uses, which has a clear, beautiful and permanent red color.

I attain this object by adding to any compound suitable for the production of glass, uranium in a quantity of at least two per cent (2%) of the weight of the mixture together with an oxidizing agent.

While any compound of uranium is suitable for the purpose, the use of uranium oxide is preferred, and the quantity in which it is added to the glass-composition may vary from two per cent (2%) to twelve per cent (12%) of the weight thereof. All oxides of uranium are adapted for use in the production of glass of the desired color and clearness, with results that vary in accordance with the quantity of oxygen present, it being preferred to use a uranium oxid having from 2% to 12% of uranium calculated to protosesqui-oxide ($U_3O_8$).

The oxidizing agent I prefer to use is nitre or sodium nitrate ($NaNO_3$) in proper quantity for the complete oxidation of the uranium or its equivalent, in its environment.

Litharge and borax may be added to the mixture to enhance the brilliancy of the glass and the color of the product may be deepened by the addition of manganese dioxide in quantities varying from one quarter to two per cent of the weight of the mixture.

My invention is applicable to any sand and soda ash mixture with or without other ingredients and the addition of litharge, borax and manganese is optional and largely dependent on the use for which the product is intended. The main function of the oxidizing agent is to counteract the effect of traces of organic matter or to correct reducing conditions if present in the material. It will be understood that should the mixture of ingredients be originally in the correct state of oxidation, the addition of the oxidizing agent would be unnecessary.

By proper selection and preparation of the uranium compound the color of the glass may be varied in depth from a very light henna to a deep ruby, and I desire it understood that the word "red" as used in this description and the hereunto appended claims, embraces any color, shade or tint which can be produced by the use of uranium oxide as herein described.

The amount of manganese added to the mixture depends largely on the impurities present in the raw material, and its exact percentage can be determined by experiment only.

The following formula I have found to be productive of a commercially valuable brilliant glass of a transparent beautifully red color, adapted for use in the manufacture of any article in which such qualities are desired: 75 parts, by weight, of sand; 80 parts, by weight, of soda ash; 70 parts, by weight, of litharge; 20 parts, by weight, of borax; 30 parts, by weight, of nitre; 24 parts, by weight, of uranium oxide; and (if necessary) 1 to 4 parts, by weight, of manganese dioxide.

What I claim and desire to secure by Letters Patent is:

1. A transparent, henna colored lead glass resulting from a composition consisting of sand 75 parts, soda ash 80 parts, litharge 70 parts, borax 20 parts, nitre 30 parts, and uranium oxide from 4 to 24 parts.

2. A transparent, henna colored lead glass resulting from a composition consisting of sand 75 parts, soda ash 80, parts, litharge 70 parts, borax 20 parts, nitre 30 parts, uranium oxide from 4 to 24 parts, and manganese dioxide from one-half to 4 parts.

In testimony whereof I have affixed my signature.

WARREN F. BLEECKER.